(12) United States Patent
Belli et al.

(10) Patent No.: US 11,635,639 B2
(45) Date of Patent: *Apr. 25, 2023

(54) SPECTACLES COMPRISING AURICULAR DEVICES

(71) Applicant: SAFILO SOCIETÀ AZIONARIA FABBRICA ITALIANA LAVORAZIONE OCCHIALI S.P.A., Padua (IT)

(72) Inventors: Nicola Belli, Padua (IT); Giorgio Manera, Padua (IT)

(73) Assignee: SAFILO—SOCIETA AZIONARIA FABBRICA ITALIANA LAVORAZIONE OCCHIALI S.P.A., Padua (IT)

(*) Notice: Subject to any disclaimer, the term of this patent is extended or adjusted under 35 U.S.C. 154(b) by 416 days.

This patent is subject to a terminal disclaimer.

(21) Appl. No.: 16/619,949

(22) PCT Filed: May 23, 2018

(86) PCT No.: PCT/EP2018/063483
§ 371 (c)(1),
(2) Date: Dec. 6, 2019

(87) PCT Pub. No.: WO2018/224308
PCT Pub. Date: Dec. 13, 2018

(65) Prior Publication Data
US 2020/0142222 A1    May 7, 2020

(30) Foreign Application Priority Data
Jun. 7, 2017  (IT) .................. 102017000062337

(51) Int. Cl.
*G02C 11/06* (2006.01)
*G02C 5/16* (2006.01)
*G02C 5/14* (2006.01)

(52) U.S. Cl.
CPC .............. *G02C 11/06* (2013.01); *G02C 5/143* (2013.01); *G02C 5/16* (2013.01); *G02C 2200/16* (2013.01)

(58) Field of Classification Search
CPC . G02C 5/14; G02C 5/143; G02C 5/12; G02C 5/008; G02C 11/10; G02C 1/00;
(Continued)

(56) References Cited

U.S. PATENT DOCUMENTS 3,000,462 A * 9/1961 Smith .................... G02C 11/06
                                                          181/130
6,118,882 A * 9/2000 Haynes .................. G08C 17/00
                                                          455/100
2010/0045928 A1    2/2010 Levy

FOREIGN PATENT DOCUMENTS

EP      0806099 A1    11/1997
WO      9623373 A1    1/1996
(Continued)

*Primary Examiner* — Jie Lei
(74) *Attorney, Agent, or Firm* — Volpe Koenig

(57) ABSTRACT

Spectacles including auricular devices are described. The spectacles include a structure having a front frame for supporting respective lenses, and a pair of arms articulated to the front frame on laterally opposite sides, each of the arms extending longitudinally between a first end that is articulated to the front frame and a second, opposite end, close to which an end arm portion can make contact with the head at the ear. Each arm extends from the second end into an arm portion that is made of flexible material and bears an element for supporting an auricular device, and the arm portion can move, on account of its flexibility, between an operating position in which the support element is worn at the ear to allow the auricular device to be positioned, and a non-operating position in which the support element is removably held on the end arm portion.

11 Claims, 2 Drawing Sheets

(58) Field of Classification Search
CPC ........ G02C 1/10; G02C 2200/16; G02C 5/00;
G02C 5/146; G02C 5/16; G02C 5/18;
G02C 5/02; G02C 5/001; G02C 8/008;
G02C 11/06; G02C 11/00; G02B 27/01;
G02B 27/017; G02B 27/0176
USPC .......... 351/123, 111, 121, 158, 41, 114, 116,
351/118, 119, 124; 359/629–633
See application file for complete search history.

(56) References Cited

FOREIGN PATENT DOCUMENTS

| | | | |
|---|---|---|---|
| WO | WO-9913682 A2 * | 3/1999 | ............. G02C 11/10 |
| WO | 2010087130 A1 | 8/2010 | |
| WO | 2015141405 A1 | 9/2015 | |

* cited by examiner

SPECTACLES COMPRISING AURICULAR DEVICES

TECHNICAL FIELD

The present invention relates to spectacles that are provided with auricular devices and have the features stated in the preamble of main claim 1.

TECHNOLOGICAL BACKGROUND

The invention lies in the specific technical field of spectacles designed in combination with auricular devices provided on the structure, in particular on the arms of the structure, in a position that is suitable for allowing them to be correctly positioned inside the ear.

These auricular devices can generally relate to conventional audio earpieces for listening to music or audio content coming from a sound source, including the audio content of telephone conversations, or may specifically relate to hearing aids for correcting hearing problems (for example for partially deaf people).

Although integrating auricular devices of the above-mentioned type in the structure, for example at the free ends of the lateral arms, on the one hand makes the earpieces noticeably more comfortable and easier to use, whatever their use may be, on the other hand a number of specific problems need to be overcome, on which the efficiency thereof depends during use.

One of these problems is associated with the need to ensure that the arm carrying the auricular device is suitably adapted to the various morphologies and dimensions of people's heads so as to ensure, in any case, that the spectacles are worn correctly on the head and that the earpiece is correctly positioned inside the ear.

Another problem, which is particularly apparent in the field of aids for hearing problems, is associated with the overall dimensions of said devices, which are often important as they are associated with the presence of possible supply batteries, microphones and amplifiers, and may therefore considerably affect the level of comfort that can be achieved when using the auricular device.

DESCRIPTION OF THE INVENTION

In this specific field, a primary object of the invention is to provide spectacles provided with auricular devices of the above-mentioned type, the structure and function of which overcome the limitations and problems illustrated.

This and other problems that are yet to become clear in the following are solved by the invention by means of spectacles formed in accordance with the appended claims.

BRIEF DESCRIPTION OF THE DRAWINGS

The features and advantages of the invention will become clearer from the following detailed description of a preferred embodiment thereof, which is illustrated by way of non-restrictive example, with reference to the attached drawings, in which.

PREFERRED EMBODIMENTS OF THE INVENTION

Figure 1:
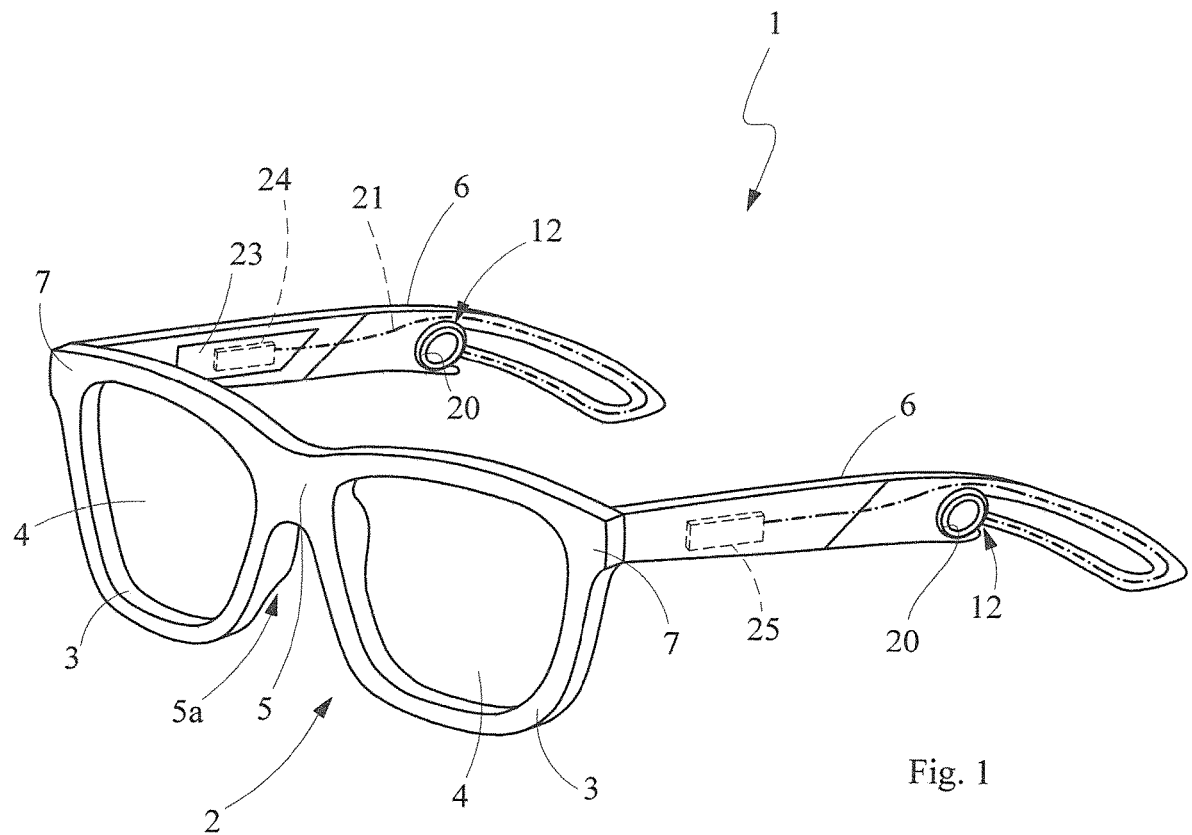
FIG. 1 is a perspective view of spectacles according to the present invention.
Figure 2:
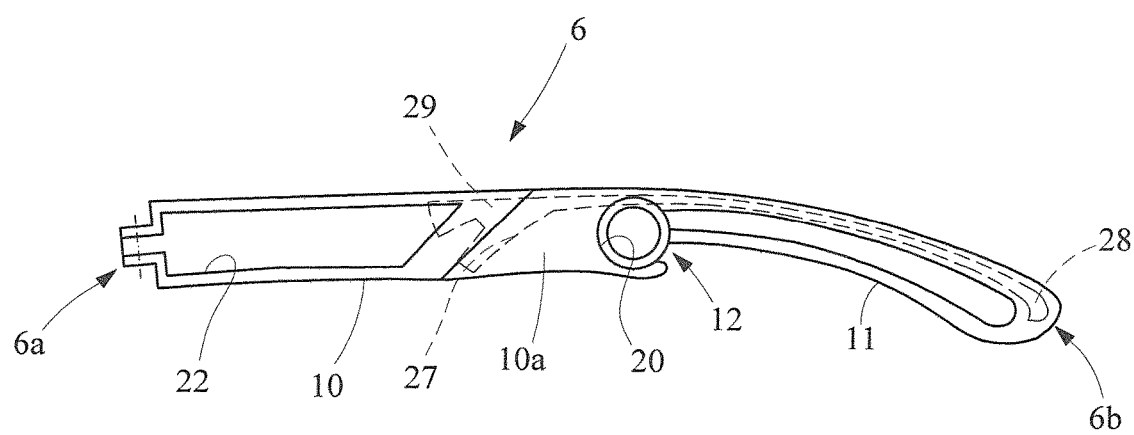
FIG. 2 is a side elevation of a lateral arm of the spectacles in FIG. 1, FIGS. 3 and 4 are side elevations of the spectacles in FIG. 1 in respective and separate operating configurations.

With reference to the cited figures, reference numeral 1 indicates an example of spectacles as a whole, which are provided with auricular devices and formed in accordance with the present invention.

The spectacles 1 comprise a structure having a front frame 2 and a pair of respective rims 3 for supporting corresponding lenses 4, the rims being connected to one another in the centre by a bridge 5 that extends in the nasal region. Reference numeral 6 indicates both of the lateral arms of the spectacles, which are articulated, by means of a hinge, to respective faces 7 provided on laterally opposing sides of the front frame 2.

A nasal-bearing device 5a, which supports the structure on the nose at the front, is provided at the bridge 5.

The spectacles 1 are provided with auricular devices, indicated by reference numeral 8 in the figures, which are designed to be operatively positioned inside the concha of the auricle and are mounted on the lateral arms 6, as will be described in more detail below.

The devices 8 are preferably formed either as earpieces, for example "in ear" earpieces (which are inserted into the ear canal of the auricle), for listening to audio content (for example music or other content, including audio content of telephone conversations), or as hearing aid auricular devices for correcting hearing problems (for example for partially deaf people).

Alternatively, the devices 8 can be formed of real sensors that sense vital parameters, for example body temperature sensors.

As a result of their structural identity (even though the arms are formed as mirror-symmetrical structures), only one of the lateral arms 6 on which the particular auricular device 8 is provided will be described in detail.

The arm 6 extends in a main longitudinal direction, between a first end 6a, at which it is articulated to the corresponding face 7 of the frame 2, and a second, opposite end 6b. An arm part 10 is located in the arm and extends from the end 6a that extends into an end arm portion 10a that extends as far as the end 6b, near to which said portion 10 can make contact with the zone of the head behind the ear.

The arm 6, and in particular the end portion 10a thereof, in turn extends from the end 6b into a further arm portion 11, which bears an element 12 for supporting the auricular device 8 at the opposite free end 11a of said portion.

The arm portion 11 is suitably made of a flexible material having a preselected degree of resilient deformation, as a result of which the portion 11 can be moved, after having been deformed due to its flexibility, between an operating position in which the support element 12 is worn in the ear in order to allow the auricular device 8 to be positioned, and a non-operating position in which the support element 12 is held on the end arm portion 10a. In particular, the support element 12 is removably held on the end arm portion 10a.

If the auricular device 8 is designed as an "in ear" earpiece, the earpiece is inserted into the aperture of the ear canal in the first operating position. In the second, non-operating position, the arm portion 11 is preferably held in a position adjacent to the end portion 10a, thereby remaining at a prefixed spacing therefrom, for example.

The end 11a of the arm portion 11, which bears the support element 12, is also held on the end arm portion 10a by means of an appropriate coupling system. In particular, the end 11a of the arm portion 11, which bears the support element 12, is removably held on the end arm portion 10a by means of an appropriate coupling system.

In one embodiment, the support element 12 is integrally formed with the arm portion 11, for example by means of injection-moulding an elastomeric material, for example rubber.

In an alternative embodiment, the support element 12 is integrally formed with the arm portion 11 by means of hot compression moulding or by means of casting.

In one embodiment, the support element 12, the arm portion 11 and the end portion 10a are integrally formed, for example by means of injection-moulding rubber.

Alternatively, the support element 12, the arm portion 11 and the end portion 10a are integrally formed by means of hot compression moulding or by means of casting.

Said support element 12 is also preferably ring-shaped and delimits a through-hole 16 having a circular cross section, the profile of which has a closed contour. Reference numerals 17 and 18 denote the respective internal and external cylindrical walls of the ring (between which the radial thickness of the ring is defined). The auricular device 8 can be removably accommodated and held inside the circular opening 16 so as to be in contact with the internal wall 17.

Figure 7:
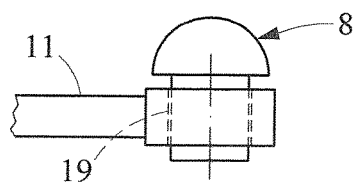
Figure 8:
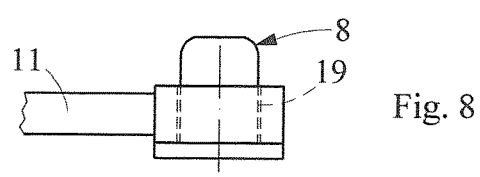
Figure 9:
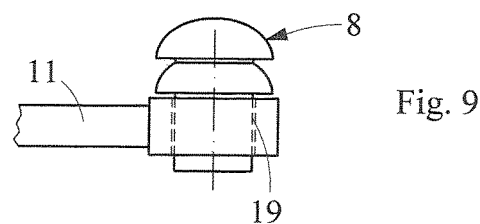

Said auricular device 8 is shown in FIG. 7-9 in three respective and separate designs, all of which have in common the fact that they provide a surface portion 19 that has a cylindrical shell and engages in the opening 16 in the support by means of a substantial form fit. Such a coupling can be formed as a pressure coupling having a small amount of resilient interference.

In addition or alternatively, the auricular device 8 can engage in and disengage from the ring-shaped support 12 by means of a "snap-in" coupling, with suitable and corresponding structures such as teeth, raised portions, depressions, grooves, etc. being provided in the profile of the cylindrical wall 17 of the support or on the surface portion 19 of the device 8.

It has been found that the use of localised structures such as teeth, raised portions, depressions, grooves, etc. can contribute both to the device 8 being removably fixed to the support 12 in a more stable manner, and to the device possibly being guided into the correct position and centred on the support, if necessary. This may be the case if the auricular device 8 were designed such that it had to be accurately oriented inside the ear for functional or ergonomic reasons.

Returning to the system for holding the support 12 on the end arm portion 10a, when moved into the non-operating position, the end arm portion 10a comprises a seat 20 in which the support element 12 can engage, preferably by means of a pressure coupling, in order to generate a small amount of resilient interference between the coupled surfaces. In particular, the support element can removably engage the seat 20.

In detail, the seat 20 is defined by a recess made in the end portion 10a, the inner cavity of which is provided with an appropriate shape and curvature so that the ring can engage in the recess in such a way that the recess and the main part of the outer cylindrical wall 18 of the ring are in contact with one another.

Applying pressure to insert the ring-shaped support into the recess causes said support to resiliently deform to a small extent, which can generate a resilient return in order to hold the support 12 in the recess.

Alternatively, the support 12 may be held in the recess in the seat 20 by means of a coupling, more specifically a resilient snap-in coupling, which is likewise suitable for holding the earpiece 8 on the end arm portion 10a in the second, non-operating position, possibly combined with insertion under pressure.

Figure 3:
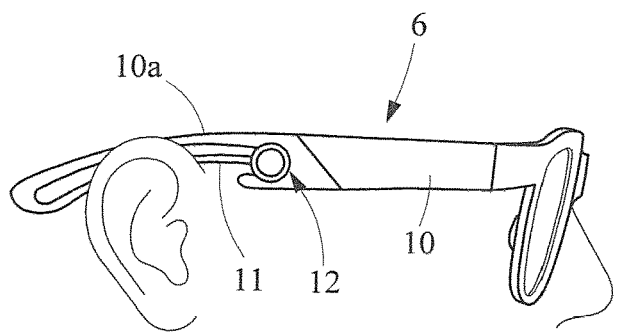
Figure 4:
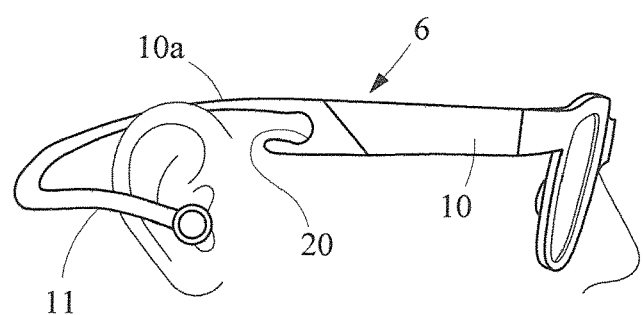
Figure 5:
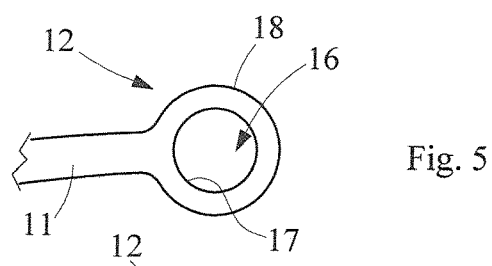
FIGS. 5 and 6 are an enlarged side elevation and an enlarged plan view, respectively, of a detail of the example in FIG. 1, and FIGS. 7, 8 and 9 are side elevations of separate embodiments of an auricular device mounted on the glasses in the preceding figures.
Figure 6:
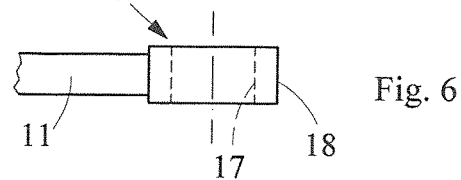

From the non-operating position in FIG. 3, the support 12, which bears the earpiece, can be easily released from the recess in the seat 20 so as to be readily moved into the operating position in FIG. 4 due to the flexibility of the arm portion 11, in which position the earpiece 8 can be positioned, with a higher degree of adaptability, so as to be inserted into the ear canal in order to fulfil its function correctly.

If signals are transmitted from and to the auricular device 8 along parts of the structure, these signals being audio signals or power-supply signals, a circuit of electrical conductors can be embedded in the corresponding parts of the structure, both inside the arms 6 and inside the front frame 2 of the structure, said circuit comprising wire conductor elements made of electrically conductive materials, for example. Said conductors can be embedded in the arms and in the front frame during the processes of moulding the respective parts, or can be positioned in suitable cavities made in the structure. FIG. 1 schematically shows, by means of a dash-dot line, the path of extension of an electrical circuit 21, which is formed in the manners mentioned above, which path runs along the structure away from and towards the auricular devices 8.

Each of the arms 6 is also provided with a corresponding housing, indicated by reference numeral 22, which is defined within the space inside the arm part 10, is open on the inner side of the arm (that faces the user's head), and is provided with a particular closure cover 23 that can be removably coupled.

In one embodiment, the housing 22 provided on one of the arms 6 accommodates a Bluetooth transmission module or device 24, whilst the housing formed on the other arm accommodates a battery 25 for supplying power.

The battery 25 and the Bluetooth transmission device 24 are electrically connected to each of the auricular devices 8 by means of the circuit 21, in order to allow said devices to function correctly.

The battery 25 is preferably a rechargeable and non-removable battery. Alternatively, the battery may also be a removable battery. The battery may also be a non-rechargeable battery, in which case it has to be removable so that it can be replaced once it is empty.

If the auricular device 8 also functions as an aid for correcting hearing problems, further components that are typical of this type of device, for example: a microphone for picking up external noises and sounds; an amplifier; a possible processor or means for processing sounds or noises; apparatuses for switching the device on/off; apparatuses for controlling the volume, i.e. the intensity of the sounds and noises transmitted into the user's ear, can also be provided in addition to the battery for supplying power, which devices are accommodated in one and/or in the other housing 22.

Alternatively, the above-mentioned components can be integrated in the auricular device itself, without therefore having to be accommodated in the arms or other parts of the structure.

In one embodiment, the end arm portion 10*a* is suitably provided with an internal cavity 27, which houses a core 28 that is made of an electrically conductive metal material or is coated with electrically conductive metal material.

Merely by way of example, the core 14 can be suitably made of steel and then coated with a conductive gold layer, which is deposited by means of a galvanic process.

The end portion 10*a* made of elastomeric material (for example rubber) is overmoulded on the core 28 by means of the injection-moulding process. Alternatively, the support element 12, the arm portion 11 and the end portion 10*a* are integrally formed by means of compression moulding or by means of casting, and the end portion 10*a* is then fixed to the core 28. Where appropriate, such a core can function as an electrical conductor means, thus being electrically connected to the electrical circuit 21, for example.

In the zone of the end portion 10*a* that rests against the arm part 10, the internal core 28 also extends into a limb 29 that engages in the arm part 10. By means of said limb 29, the core 28 can also be electrically connected to the components that are accommodated in the corresponding housing 22 provided inside the arm part 10.

At the end 6*b* of the arm, the internal core 28 can also be electrically connected to the conductor wires of the circuit that run along the arm portion 11 as far as the support 12.

An electrical connection is also provided between the conductors of the circuit that extend up to the ring-shaped support 12 and the circuitry provided inside the auricular device 8.

In one embodiment, the arm part 10 is made of a plastics material that is stiff and cannot deform to the same extent as the elastomeric material used to form the end portion 10*a*.

The core 28, both in terms of the features of the preselected metal material and its overall geometry, can plastically deform, thereby rendering the end arm portion 10*a* "adjustable", that is adaptable, in order to adapt the shape of said end arm portion to the user's head so that the spectacles are both comfortable and stable to wear.

In fact, if the end arm portion 10 is subjected to an adjustment operation, the core 28 is plastically deformed and tends to maintain its new shape, whereas the elastomer (or rubber) that encompasses the core 28 instead tends to resiliently deform as a result of being resiliently yielding, and follows the new fold imparted on the core, and is therefore linked to the new shape assumed as a result of the rigidity of the core.

The invention solves the predetermined problems by achieving the advantages stated with respect to the solutions highlighted.

One main advantage consists in that, by means of the spectacles of the present invention formed in combination with auricular devices, the spectacles are able to adapt to different morphologies and dimensions of the head more effectively, which ensures, in any case, that the spectacles are worn on the head correctly and that the earpiece is correctly positioned inside the ear.

Another advantage is that, by means of the spectacles of the invention, the auricular devices can have advantageously smaller dimensions, in particular if additional components are provided, for example batteries and Bluetooth transmission devices or auricular components in the form of hearing aids, since these components can be housed in the arms, thereby making it possible to reduce the dimensions of the earpieces and thus achieving improved comfort by reducing both the space and the weight of the earpiece in the ear.

The invention claimed is:

1. Spectacles comprising auricular devices, comprising a structure having a front frame (2) for supporting respective lenses (4),
and a pair of arms (6) that are articulated to the front frame on laterally opposite sides, each of said arms (6) comprising an arm part (10) that extends in a longitudinal direction between a first end (6*a*) that is articulated to the front frame (2) and a second, opposite end (6*b*), close to which an end arm portion (10*a*) of the arm part (10) can make contact with a user's head at an ear thereof, wherein
each arm (6) extends from said second end (6*b*) into an arm portion (11) that is made of flexible material and bears an element (12) for supporting an auricular device (8), said arm portion (11) is moveable between an operating position in which said support element (12) is worn at the ear to allow the auricular device (8) to be positioned, and a non-operating position in which said support element (12) is held on the end arm portion (10*a*);
said arm portion (11) has a main extension in the longitudinal direction between said second end (6*b*) and an opposite free end (11*a*) of said portion (11), said support element (12) being provided on the arm portion (11) at said free end (11*a*) and wherein the support element (12), the arm portion (11) and the end arm portion (10*a*) are integrally formed.

2. The spectacles according to claim 1, wherein at least said arm portion (11) is made of a resiliently deformable elastomeric material.

3. The spectacles according to claim 1, wherein said support element (12) is integrally formed with the arm portion (11) by means of injection-molding or hot compression molding or casting.

4. The spectacles according to claim 1 wherein said support element (12) is engagable in an associated seat (20) made in said arm (6) so as to hold said support element (12) in the second, non-operating position.

5. The spectacles according to claim 4, wherein said seat (20) is provided in the end arm portion (10*a*).

6. The spectacles according to claim 4, wherein a snap-in or pressure coupling is provided between said support element (12) and said seat (20).

7. The spectacles according to claim 4, wherein said support element (12) can removably engage said seat (20).

8. The spectacles according to claim 1, wherein said support element (12) is ring-shaped, said ring being formed in one piece with the arm portion (11), an opening (16) defined in the ring configured to removably accommodate and hold said auricular device (8).

9. The spectacles according to claim 1, further comprising a circuit (21) of electrical conductors that extends inside said arms (6) and/or inside the front frame (2) in order to electrically connect said auricular device (8) to components required for the auricular device to function.

10. The spectacles according to claim 9, wherein at least one of said arms (6) comprises a re-closable housing (22) that can accommodate at least some of said components.

11. The spectacles according to claim 1, wherein said support element (12) is removably held on the end arm portion (10*a*).

* * * * *